(12) United States Patent
Mantke et al.

(10) Patent No.: US 9,061,619 B2
(45) Date of Patent: Jun. 23, 2015

(54) INSERT FOR RECESS IN UPHOLSTERY AND VEHICLE SEAT

(75) Inventors: Jörg Mantke, Leverkusen (DE); Peter Dubec, Melcice-Lieskove (SK)

(73) Assignee: JOHNSON CONTROLS GMBH, Burscheid (DE)

( * ) Notice: Subject to any disclaimer, the term of this patent is extended or adjusted under 35 U.S.C. 154(b) by 197 days.

(21) Appl. No.: 13/816,692

(22) PCT Filed: Aug. 12, 2011

(86) PCT No.: PCT/EP2011/063935
§ 371 (c)(1),
(2), (4) Date: Apr. 15, 2013

(87) PCT Pub. No.: WO2012/020125
PCT Pub. Date: Feb. 16, 2012

(65) Prior Publication Data
US 2013/0221715 A1    Aug. 29, 2013

(30) Foreign Application Priority Data

Aug. 13, 2010 (DE) .......................... 10 2010 034 273
Apr. 14, 2011 (DE) .......................... 10 2011 002 045

(51) Int. Cl.
*A47C 31/00*     (2006.01)
*A47D 1/10*      (2006.01)
(Continued)

(52) U.S. Cl.
CPC ............ *B60N 2/6018* (2013.01); *B60N 2/2893* (2013.01); *B60N 2/2887* (2013.01); *B60N 2/289* (2013.01); *B60N 2/58* (2013.01); *B60N 2/5825* (2013.01); *B60N 2/6009* (2013.01)

(58) Field of Classification Search
CPC .... B60N 2/289; B60N 2/2893; B60N 2/2887; B60N 2/2863; B60N 2/286; B60N 2/6018; B60N 2/28; B60N 2/58; B60N 2/5825; B60N 2/6009
USPC ................................................ 297/253, 463.1
See application file for complete search history.

(56) References Cited

U.S. PATENT DOCUMENTS 4,637,650 A * 1/1987 Inoue ............................ 297/410
5,588,189 A  12/1996 Gorman et al.
(Continued)

FOREIGN PATENT DOCUMENTS

DE    198 34 861 C1    8/1999
DE    200 15 161 U1    12/2000
(Continued)

OTHER PUBLICATIONS

International Search Report received in connection with International Application No. PCT/EP2011/063935; dtd Nov. 23, 2011.
(Continued)

*Primary Examiner* — Milton Nelson, Jr.
(74) *Attorney, Agent, or Firm* — Foley & Lardner LLP

(57) ABSTRACT

A cover element is for a recess in the upholstery of a vehicle seat, and connects to a securing part which is secured to the vehicle or to the vehicle seat and arranged within the recess in the upholstery, for the purpose of releasable, rigid attachment of an object to the vehicle seat. In particular, it can be for the ISOFIX connection of a removable child's seat. The cover element is designed as an insert which can be arranged in a removable fashion on the securing part. Furthermore, a vehicle seat having a recess in the upholstery can include an insert with an arresting mechanism to prevent unintentional complete detachment of the insert.

8 Claims, 2 Drawing Sheets

Figure 1:
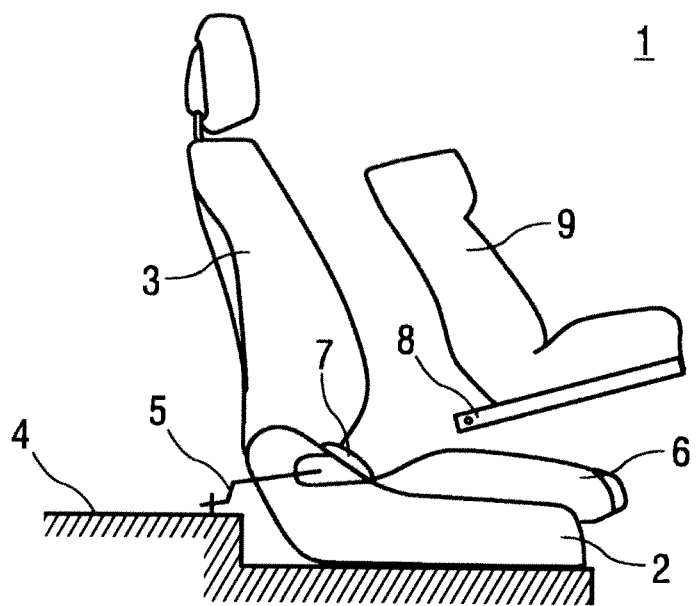

(51) Int. Cl.
*B60N 2/28* (2006.01)
*B60N 2/60* (2006.01)
*B60N 2/58* (2006.01)

(56) References Cited

U.S. PATENT DOCUMENTS

| | | | |
|---|---|---|---|
| 6,601,917 | B1 | 8/2003 | Christopherson |
| 7,093,331 | B1 | 8/2006 | Holmberg et al. |
| 2007/0176476 | A1* | 8/2007 | Weber .......................... 297/253 |
| 2010/0186201 | A1 | 7/2010 | Nagata |

FOREIGN PATENT DOCUMENTS

| | | |
|---|---|---|
| DE | 100 44 621 C1 | 2/2002 |
| EP | 1 215 077 A1 | 6/2002 |
| FR | 2975643 A1 * | 11/2012 |

OTHER PUBLICATIONS

Office Action received in connection with German Patent Application No. 10 2011 002 045.4, dated Jul. 18, 2011.

* cited by examiner

INSERT FOR RECESS IN UPHOLSTERY AND VEHICLE SEAT

CROSS REFERENCE TO RELATED APPLICATIONS

The present application is a National Stage of International Application No. PCT/EP2011/063935 filed on Aug. 12, 2011, which claims the benefit of German Patent Application No. 10 2010 034 273.4 filed on Aug. 13, 2010 and German Patent Application No. 10 2011 002 045.4 filed on Apr. 14, 2011, the entire disclosures of which are incorporated herein by reference.

The invention relates to a cover element for a recess in the upholstery of a vehicle seat pursuant to the generic part of Claim 1. The invention furthermore relates to a vehicle seat with a recess in the upholstery.

PRIOR ART

Generic inserts and vehicle seats are known from practical applications.

DE 200 150161 U1 relates to a vehicle seat with a retaining device for a releasable connection of an object, in particular a child's seat, wherein the retaining device is rigidly connected with the seat frame component, and if not used can be covered by a pad belonging to the seat and is attached on the seat frame component covered area which is covered by the seat back, wherein the retaining device is covered by a padded flap covering the lower area of the seat back padding, which for the purpose of access to the fixture can be swiveled to the top around a pivot axis, wherein the backrest and the padded flap are continously covered with a one-piece seat cover, and the pivot axis is developed in the seat cover of the backrest, which for the formation of the pivot axis is defined linear relative to the pad of the backrest.

DE 100 44 621 C1 relates to a vehicle seat with a restraint device for a releasable rigid mounting of an object, in particular child seats on the vehicle seat, wherein the restraint device is arranged approximately in the interspace between the backrest contact surface and the seat surface of the vehicle seat within the seat padding and can be covered with a cover when not in use. It is the object of the invention to provide for such type of vehicle seat a cover for its retaining means, which can function without having to remove padding components from the upholstery composite. For this purpose, the retaining device is arranged in a duct surrounded by the upholstery, which opens into the upholstery surface and can be locked by a pivoted flap on the duct.

US 2007/0176476 A1 relates to a seating arrangement for a vehicle.

DE 198 34 861 C1 describes a child's seat, in particular for automobiles, with a top structure and a substructure and can be attached on a vehicle seat by means of an attachment device. The top structure can be moved relative to the substructure and be fixed in at least one position.

DE 100 44 621 C1 relates to a vehicle seat with a restraint device for a releasable rigid mounting of an object, in particular child seats on the vehicle seat, wherein the restraint device is arranged approximately in the interspace between the backrest contact surface and the seat surface of the vehicle seat within the seat padding and can be covered with a cover when not in use. For this purpose, the retaining device is arranged in a duct surrounded by the upholstery, which opens into the upholstery surface and can be locked by a pivoted flap on the duct.

PURPOSE

The purpose of the present invention is to indicate an improved cover element for a recess in the upholstery of the vehicle and indicate an improved vehicle seat with a recess in the upholstery.

SOLUTION

With respect to the cover element for a recess in the upholstery of a vehicle seat, the object is solved by the features stated in Claim 1. With respect to the vehicle seat with a recess in the upholstery, the object is solved by the features stated in Claim 5.

Advantageous developments of the invention are subject of the sub claims.

With the cover element for a recess in the upholstery of a vehicle seat, wherein inside of the recess of the upholstery, a securing part which is secured to the vehicle or to the vehicle seat for the purpose of a releasable, rigid attachment of an object to the vehicle seat, in particular for a traditional standardized attachment device for a removable child's seat, the cover element is designed as an insert which can be arranged in a removable fashion on the securing part which comprises arresting means to prevent unintentional complete detachment of the insert from the vehicle seat and/or the securing part. Consequently, a complete detachment of the insert from the vehicle seat is prevented to the extent possible, which reduces the risk of injury in the vehicle as a result of uncontrolled moving inserts.

Preferably, at least one slot is shaped in the insert, which is shaped so that it corresponds to the securing part. As a result, the insert can be arranged form-closed on the securing part.

In an advantageous embodiment, the slot of the insert comprises a hook-shaped course in the direction of insertion of the securing part. The securing part is consequently held form-closed at the end of the hook-shaped slot of the insert.

Particularly preferred, means are arranged in the insert for connecting the fixable securing part that can be inserted into the slot of the insert and in the slot by means of a form closing means.

In a particularly advantageous embodiment, in the slot, an arresting means is arranged upstream of the form-closing means in the direction of insertion. This arresting means prevents unintentional complete detachment of the insert from the vehicle seat and/or the securing part.

The arresting means is particularly advantageously arranged on the exit of the slot.

Expediently, the arresting means is designed as a spring tongue which projects into the slot. This type of design is favorable with respect to the tooling and use of material.

The spring tongue is especially preferably aligned inclined towards the securing part in the direction of insertion. A particularly simple and durable construction is a preferred design, in which the spring tongue is essentially designed as a shoulder on the bottom of an essentially pot-shaped insert.

In an advantageous embodiment, the insert has a collar shaped plastic cover on its side opposite of the slot, which can be made to contact one vehicle seat cushion. This facilitates a flush, preferably stepless transition between vehicle seat cushion and insert.

With a vehicle seat with a recess in the upholstery, wherein inside of the recess of the upholstery, a securing part which is secured to the vehicle or to the vehicle seat for the purpose of a releasable, rigid attachment of an object to the vehicle seat, in particular for a traditional standardized attachment device for a removable child's seat, an insert is arranged on the securing part which is arranged so that it can be removed and which comprises arresting means to prevent unintentional complete detachment of the insert from the vehicle seat and/or from the securing part. Consequently, an unintentional complete detachment of the insert from the securing part can be safely prevented, since a detachable insert is retained on the securing part by the arresting means.

A further advantage is that the insert is provided with an insertion aperture that is arranged opposite the slot.

In this context it is also preferred that the insertion aperture for inserting a locking mechanism that can be latched on the securing part, in particular a child's seat, is provided. For this purpose it is preferred that the insert is designed in the form of a sleeve. In this context it is particularly advantageous that the insert comprises two walls that are aligned reciprocally parallel, into which respectively congruent slots extend.

By means of the insert which has already been described in detail and which is arranged on the vehicle seat, a flush preferably stepless transition in a manner which has already been described is possible between the vehicle seat padding and the insert, and therefore a complete covering of the recess in the upholstery of the vehicle seat padding.

FIGURES

Figure 2:
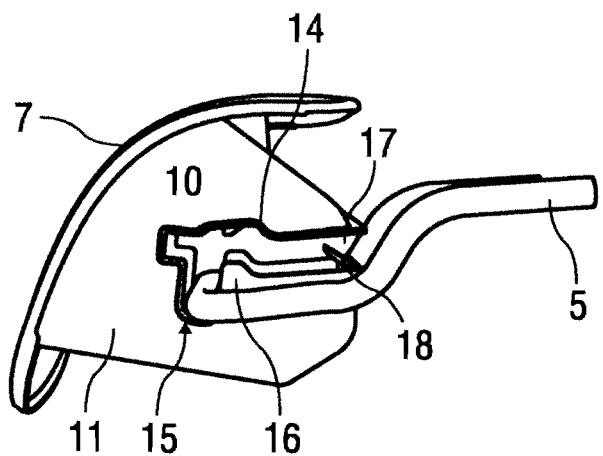
Figure 3:
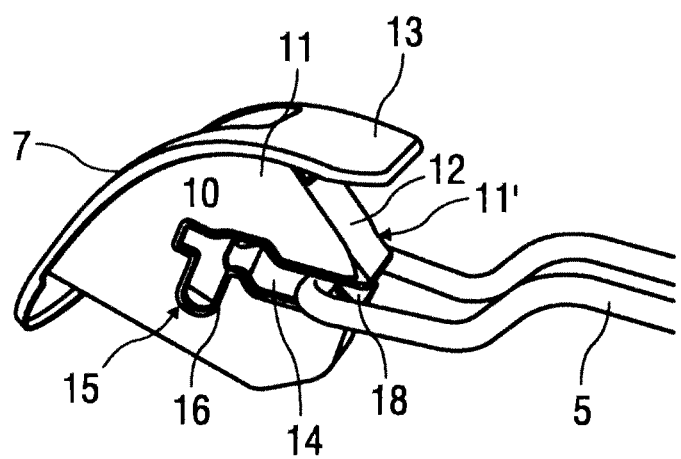

The invention will be described in detail with reference to the attached schematic figures, as follows:

FIG. 1 is a schematic lateral view of a vehicle seat with a child's seat, as taught by the invention, FIG. 2 is a schematic perspective illustration of an insert arranged on a securing part, in a position of use, and FIG. 3 is a schematic perspective illustration of an insert arranged on a securing part, in a retaining position.

In all Figures, corresponding parts have been provided with the same reference symbols.

As FIG. 1 shows, the vehicle seat 1 consists of a seat component 2 at a seat back 3. A bow-shaped securing part 5 is attached on the vehicle floor 4 behind the vehicle seat 1, which extends through the transition area between the seat component 2 and the seat back 3 in direction of the seat surface 6 and from there leads into a molded insert 7 forming a positive joint. The locking mechanism 8 of a removable child's seat 9 can be inserted into the insert 7 from the seat surface 6, which is provided for the traditional, standardized, detachable latching with the securing part 5. Alternatively, the securing part 5 can also be attached on the vehicle seat 1 structure, for example.

As FIG. 2 shows, the insert 7 consists of a sleeve-like framework 10 which is essentially pot-shaped and closed on the end, with two reciprocally parallel walls 11, 11' and a base 12. A collar-like, plastic cover 13 is molded onto the framework 10, where said molding supports itself on its lateral periphery on the padding of the seat back 3 after the insert 7 is installed. The insert 7 is preferably designed as a plastic injection molding.

The walls 11, 11' are, starting from the base 12, provided with a slot 14 into which the bow-shaped securing part 5 can be inserted. The slot 14 comprises a hook-shaped configuration with a guide 16, which acts as a positive engagement means 15 for the securing part 5. Following the assembly, the securing part 5 is retained in the positive engagement means by the pressure exerted by the padding (FIG. 2a). In case that the pressure of the padding subsides or the or the positive engagement is lost in it another manner, the securing part 5 sliding back in the slot 14 is caught by arresting means 17, so that the insert 7 cannot detach completely from the securing part 5. FIG. 3 illustrates this retaining position.

The arresting means 17 consists of a spring tongue 18 which is molded onto the exit of the slot 14 on the base 12, which protrudes into the slot 14 and is inclined in the direction of the positive engagement means 15. The remaining gap between the free end of the spring tongue 18 and the slot (14) in this instance is clearly significantly less than the diameter of the bowl-shaped securing part 5, so that the securing part 5 rebounding in the slot 14 is caught. As a result of the inclination of the spring tongue 18, the securing part 5 can be inserted into the slot 14, using little force however. If it is intended to remove the insert 7, the spring tongue 18 has to be deliberately bent down using a tool, in order to open up a sufficiently free cross-section of the slot 14, so that the securing part 5 can be released.

LIST OF REFERENCE SYMBOLS

1 Vehicle seat
2 Seat component
3 Seat back
4 Vehicle floor
5 Securing part
6 Scat surface
7 Insert
8 Locking mechanism
9 Child seat
10 Framework
11,11' Wall
12 Base
13 Plastic cover
14 Slot
15 Positive engagement means
16 Guide
17 Arresting means
18 Spring tongue

The invention claimed is:

1. A cover element for attachment to a securing part, wherein the securing part is secured to a vehicle or to a vehicle seat and is arranged within a recess in upholstery of the vehicle seat for a releasable rigid attachment of an object on the vehicle seat, the cover element comprising:
    an insert which is removably attachable to the securing part, and including at least one slot that extends along a direction of insertion of the securing part, and a positive engagement mechanism and an arresting mechanism disposed within the at least one slot, wherein the arresting mechanism is configured to prevent unintentional complete detachment of the insert from the securing part,
    wherein a shape of the at least one slot corresponds to a shape of the securing part such that the securing part is insertable into the slot along the direction of insertion,
    wherein the slot has a hook-shaped configuration along the direction of insertion,
    wherein the positive engagement mechanism is configured to retain the securing part in the slot at a first position along the direction of insertion,
    wherein the arresting mechanism is upstream of the positive engagement mechanism within the slot in the direction of insertion and is configured to retain the securing part in the slot at a second position along the direction of insertion.

2. The cover element according to claim 1 wherein the arresting mechanism is arranged at the exit of the slot.

3. The cover element according to claim 1, wherein the insert on its side opposite of the slot comprises a collar-shaped plastic cover which can be brought into contact with a vehicle seat padding.

4. The cover element according to claim 1, wherein the arresting mechanism is a spring tongue which projects into the slot.

5. The cover element according to claim 4, wherein the spring tongue is aligned inclined in the direction of insertion of the securing part.

6. A vehicle seat with a recess in upholstery of the vehicle seat, wherein a securing part in the recess of the upholstery is secured to a vehicle or to the vehicle seat for a releasable, rigid attachment of an object on the vehicle seat comprising:
   an insert which is removably attachable to the securing part and comprises at least one slot that extends along a direction of insertion of the securing part, and a positive engagement mechanism and an arresting mechanism disposed within the at least one slot, wherein the arresting mechanism is configured to prevent unintentional complete detachment of the insert from the vehicle seat and/or from the securing part,
   wherein a shape of the at least one slot corresponds to a shape of the securing part such that the securing part is insertable into the slot along the direction of insertion,
   wherein the slot has a hook-shaped configuration along the direction of insertion,
   wherein the positive engagement mechanism is configured to retain the securing part in the slot at a first position along the direction of insertion,
   wherein the arresting mechanism is upstream of the positive engagement mechanism within the slot in the direction of insertion and is configured to retain the securing part in the slot at a second position along the direction of insertion.

7. The vehicle seat according to claim 6, wherein the arresting mechanism is arranged on the exit of the slot and is a spring tongue which projects into the slot, wherein the spring tongue is aligned inclined in the direction of insertion of the securing part.

8. The vehicle seat according to claim 6, wherein the insert has a collar-shaped plastic cover on its side opposite the slot, which can be brought into contact on a vehicle seat padding, wherein said plastic cover is shaped corresponding to the recess of the vehicle seat and completely covers the recess in an assembled state.

\* \* \* \* \*